(12) United States Patent
Haines et al.

(10) Patent No.: US 6,937,999 B1
(45) Date of Patent: Aug. 30, 2005

(54) REORDER-ASSISTANCE FUNCTIONALITY LEVELS

(75) Inventors: Robert E. Haines, Boise, ID (US); Mark A. Harper, Middleton, ID (US); Kenley Hinrichs, Eagle, ID (US); Mary B. Baumunk, Boise, ID (US); Jodi Goettemoeller, Boise, ID (US); Sharon Whaley, Meridian, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 156 days.

(21) Appl. No.: 09/710,366

(22) Filed: Nov. 10, 2000

(51) Int. Cl.$^7$ .............................................. G06F 17/60
(52) U.S. Cl. ........................... 705/26; 705/27; 399/10; 399/23; 399/8; 399/12
(58) Field of Search ................... 705/26, 27; 399/10, 399/23, 8, 12

(56) References Cited

U.S. PATENT DOCUMENTS

| | | | | |
|---|---|---|---|---|
| 5,694,551 | A | * | 12/1997 | Doyle et al. ................. 395/226 |
| 5,799,157 | A | * | 8/1998 | Escallon ....................... 705/27 |
| 5,901,286 | A | * | 5/1999 | Danknick et al. ....... 395/200.33 |
| 6,003,078 | A | * | 12/1999 | Kodimer et al. ............ 709/224 |
| 6,199,099 | B1 | * | 3/2001 | Gershman et al. .......... 709/203 |
| 6,233,408 | B1 | * | 5/2001 | Allen ............................. 399/8 |
| 6,333,790 | B1 | * | 12/2001 | Kageyama ................. 358/1.15 |
| 6,401,085 | B1 | * | 6/2002 | Gershman et al. ............. 704/4 |
| 6,405,178 | B1 | * | 6/2002 | Manchala et al. ............ 705/29 |
| 6,411,891 | B1 | * | 6/2002 | Jones .......................... 701/201 |
| 6,473,788 | B1 | * | 10/2002 | Kim et al. ................... 709/209 |
| 6,529,692 | B1 | * | 3/2003 | Haines et al. ................. 399/27 |
| 6,629,134 | B2 | * | 9/2003 | Hayward et al. ........... 709/217 |
| 6,798,997 | B1 | * | 9/2004 | Hayward et al. ............. 399/12 |
| 2001/0001582 | A1 | | 5/2001 | Walker |
| 2002/0019778 | A1 | * | 2/2002 | Isaacson et al. .............. 705/26 |
| 2002/0049644 | A1 | * | 4/2002 | Kargman ...................... 705/26 |
| 2002/0065736 | A1 | * | 5/2002 | Willner et al. ................ 705/26 |
| 2002/0065950 | A1 | * | 5/2002 | Katz et al .................... 709/318 |

FOREIGN PATENT DOCUMENTS

| | | |
|---|---|---|
| EP | 1085441 A2 | 3/2001 |
| EP | 1126391 A2 | 8/2001 |
| JP | 2000137418 | 5/2000 |
| JP | 2000187698 | 7/2000 |
| JP | 2000194767 | 7/2000 |

(Continued)

OTHER PUBLICATIONS

Katz, U.S. Provisional Appl. No. 60/235,495, Transactional system responsive to peripheral device detection and notification., dated Sep. 26, 2000.*

(Continued)

*Primary Examiner*—Mark Fadok (57) ABSTRACT

A consumable order assistance system is provided for computer peripheral devices. The system includes a personal computer, at least one computer peripheral device, a communication link, and a consumable order assistance computer program. The personal computer has a web browser and a messaging system. The at least one computer peripheral device has a messaging system. The communication link signal couples the personal computer with a provider of a consumable for the computer peripheral device via the web browser. The consumable order assistance computer program is provided on the personal computer and is configured to receive a notification from the computer peripheral device via the messaging system of a need to order a consumable, alert a user of the personal computer of the notification, and provide an order location to the user for the consumable. A method is also provided.

24 Claims, 5 Drawing Sheets

FOREIGN PATENT DOCUMENTS

JP  2001024838  1/2001

OTHER PUBLICATIONS

Isaacson, U.S. Provisional Appl. No. 60/194,632, system and method for placing orders, dated Apr. 4, 2000.*

IBM Technical Disclosure, Disk drive with embedded hyper-text markup language server, vol 38, issue 12, dated Dec. 1, 1995 pp. 479-480.*

UK Search Report.

* cited by examiner

FIG. 4A

REORDER-ASSISTANCE FUNCTIONALITY LEVELS

FIELD OF THE INVENTION

This invention pertains to computers and computer peripheral devices that utilize consumables. More particularly, this invention relates to rendering of assistance when ordering consumables to replenish consumables that are being depleted by a computer peripheral device that communicates with a computer and is provided within a single connection environment, an unmanaged network environment, or a centralized enterprise network environment.

BACKGROUND OF THE INVENTION

As computer systems have gained widespread use, particularly within home environments, the use of computer peripheral devices has increased significantly. Likewise, the utilization of consumables for such computer peripheral devices has also increased significantly. One problem often encountered with any computer system results because consumables are manually ordered by a user either when they run out of a consumable, or when the computer peripheral device or associated personal computer notifies the user that the consumables have been or are about to be depleted.

One such environment comprises a home environment including a personal computer (PC) and a dedicated computer peripheral device such as a printer that is coupled with the PC via a local (or system) bus. Such an environment has been referred to as a single connection environment, and is exclusive of a computer network environment, but may include a connection to an external network such as the Internet. Another environment comprises an unmanaged network environment including a personal computer (PC), an unmanaged network, and a computer peripheral device having an embedded web server. Yet another environment comprises a managed, enterprise network environment including a server, one or more personal computers (PCs), and one or more computer peripheral devices.

The ordering of consumables for computer peripheral devices within any one or more of the above environments has previously been a manual process. For example, consumables are manually ordered by single connection environment users for photo copiers, facsimile machines, printers and multiple function peripheral devices that include more than one of these functional devices. Due to the wide adoption of such devices within these environments, a need exists to be able to more easily and accurately order consumables to replenish depleted consumables. For example, a need exists to assist in ordering of paper, toner, toner supply cartridges, ink, and ink reservoirs. Furthermore, a need exists for a solution that can be readily configured to suit a customers needs, and a specific environment.

The ability to enhance ordering of consumables in a manner that provides multiple levels of functionality so as to facilitate use with a number of different environments would greatly increase the user experience and minimize the time and effort needed to maintain consumables and keep computer peripheral components functional. Accordingly, it is desirable to enhance the ease and speed with which consumables are replenished and/or replaced so that adequate supplies of consumables are available for a computer peripheral device when such consumables are sufficiently depleted so as to warrant replenishment.

SUMMARY OF THE INVENTION

A system and method are provided for assisting a user in detecting a need to replenish a consumable. Additionally, the system and method can assist and/or automatically order such consumable for purposes of replenishing the consumable.

According to one aspect, a consumable order assistance system is provided for computer peripheral devices. The system includes a personal computer, at least one computer peripheral device, a communication link, and a consumable order assistance computer program. The personal computer has a web browser and a messaging system. The at least one computer peripheral device has a messaging system. The communication link signal couples the personal computer with a seller, reseller or other provider of a consumable for the computer peripheral device via the web browser. The consumable order assistance computer program is provided on the personal computer and is configured to receive a notification from the computer peripheral device via the messaging system of a need to order a consumable, alert a user of the personal computer of the notification, and provide an order location to the user for the consumable.

According to another aspect, a computer-implemented system is provided which implements a program in which consumable components of computer peripheral devices are replenished. The system includes a notification system, a facilitation system, at least one from a list of a consolidation system, an authorization system, and an order assistance system. The notification system alerts a user of a personal computer that they need to order a consumable for a computer peripheral device associated with the personal computer. The facilitation system provides a communication link with a provider of the consumable. The consolidation system is provided for consolidating a plurality of orders. The authorization system is provided for confirming that a user is authorized to place and order for the consumable. The order assistance system is provided to place an order for the consumable.

According to yet another aspect, a method is provided for assisting with an order process. The method includes: providing a computer peripheral device, a personal computer having a communication link with a provider of a consumable, and a messaging system extending between the computer peripheral device and the personal computer; detecting a need to replenish a consumable at the computer peripheral device; notifying a user at the personal computer of the need to replenish the consumable; providing an order address location to a user for a provider of the consumable; and placing an order for the consumable with the provider using the personal computer.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention as applied to three different environments. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
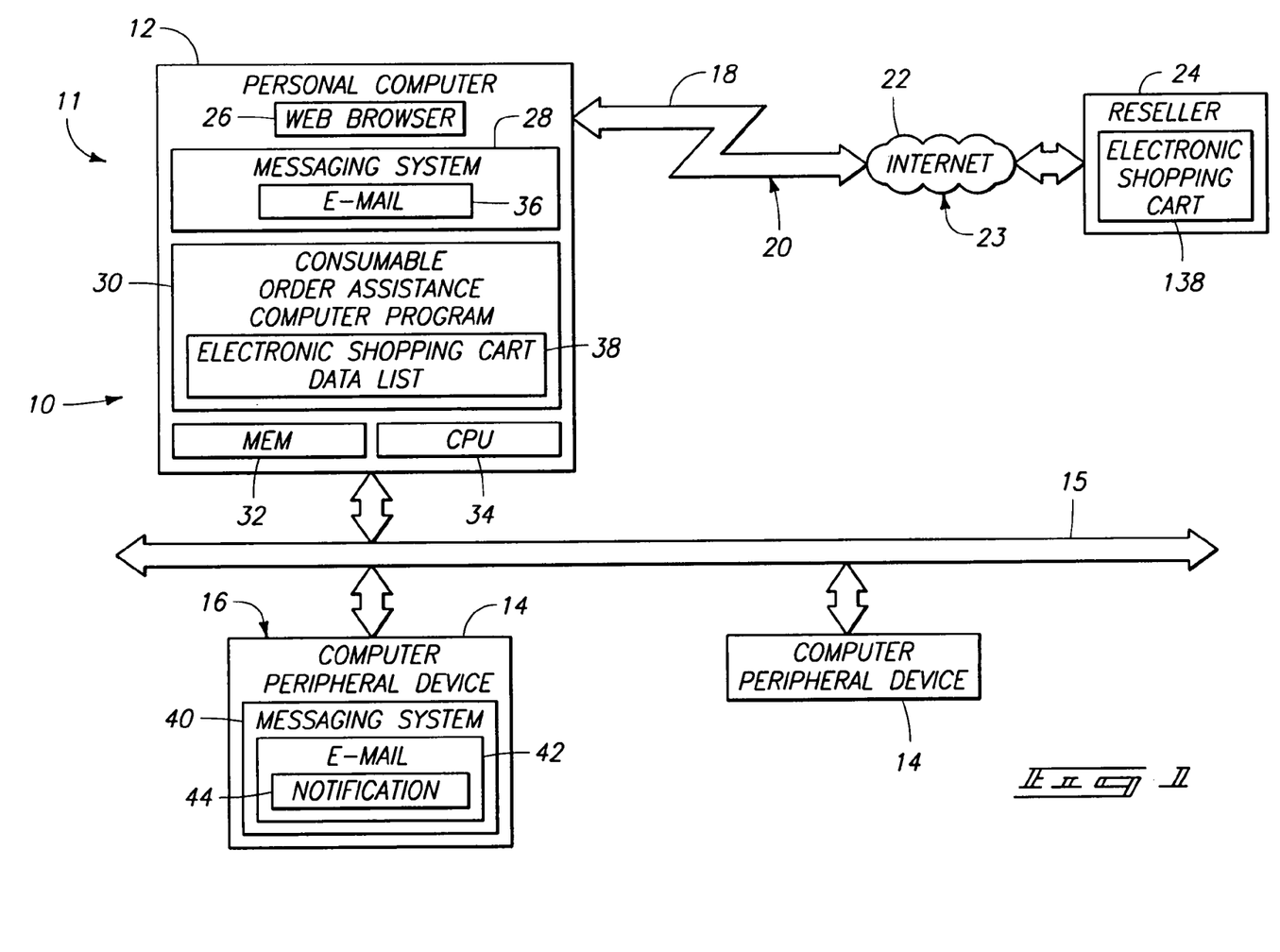
FIG. 1 is a simplified block diagram of a consumable order assistance system within a generic environment including a personal computer (PC) and a plurality of computer peripheral devices that are coupled together with a local bus, and wherein the personal computer (PC) includes a communication link with an external network such as the Internet, in accordance with one embodiment of the present invention.

FIG. 1 is a simplified block diagram of a consumable order assistance system 10 within a generic environment 11 including a personal computer (PC) 12 and one or more computer peripheral devices 14 that are coupled together with PC 12 via a bus 15. According to one embodiment, computer peripheral device 14 comprises a printer 16, such as a laser printer. The personal computer (PC) 12 includes a communication link 18, in one form an Internet connection 20, with an external network 22 such as the Internet 23. The Internet 23 connects together a reseller, seller or other provider 24 of consumables with PC 12 via communication link 18.

More particularly, PC 12 comprises a web browser 26, a messaging system 28, a consumable order assistance computer program 30, memory 32, and a central processing unit (CPU) 34. Messaging system 28 comprises an e-mail application program 36. Additionally, consumable order assistance computer program 30 comprises an electronic shopping cart data list 38 which provides a pre-formatted arrangement of data for an electronic shopping cart 138 within a web site of reseller 24. Data list formats data that is needed to fill in shopping cart 138, such as order information identifying a consumable and order location information for the consumable.

As used herein, the term "electronic shopping cart" refers to a piece of software that functions as a catalog and ordering process for an online reseller store. A shopping cart provides an interface between a company's web site and deeper web site infrastructure. More particularly, the electronic shopping cart enables a customer to select merchandise, review selected items, make modifications or additions to an order, and purchase merchandise. Shopping carts are presently commercially available, and are sold as independent pieces of software, wherein companies integrate a shopping cart into a specific online solution. Alternatively, shopping carts can be offered as a feature from a service provider that creates and hosts a company's e-commerce site.

Computer peripheral device 14 also comprises a messaging system 40. Messaging system 40 comprises an e-mail application program 42. E-mail application program is configured to send notifications to a user at PC 12 indicating a need to order a consumable at computer peripheral device 14.

Figure 2:
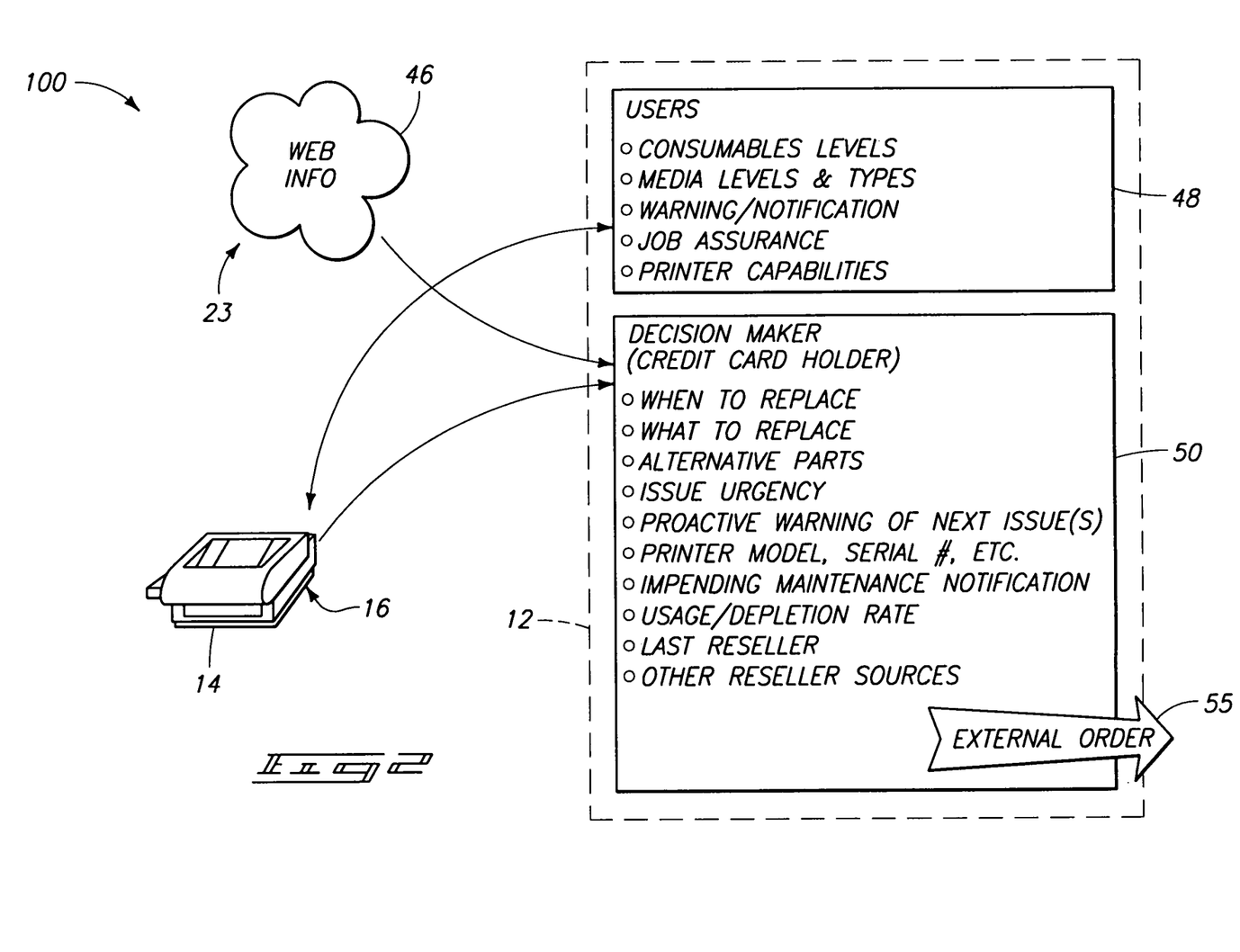
FIG. 2 is a simplified block diagram of the consumable order assistance system of FIG. 1 as applied to a home or single connection environment.

When environment 11 comprises a single connection environment (as shown in FIG. 2), bus 15 comprises a local bus. When environment 11 comprises an unmanaged, network environment, bus 15 comprises a network connection or network pathway (or channel) extending between multiple devices within a common network. When environment 11 comprises a managed, enterprise network environment, bus 15 comprises an enterprise network connection or pathway extending between multiple devices and servers within one or more interconnected networks.

Consumable order assistance system 10 includes PC 12, at least one peripheral device 14, communication link 18, and consumable order assistance computer program 30. PC 12 has web browser 26 and messaging system 28 which cooperates with messaging system 40 of peripheral device 14. Communication link 18 signal couples PC 12 with reseller, or seller, 24 of at least one consumable for peripheral device 14 using web browser 26. In operation, consumable order assistance computer peripheral program 30 is configured to receive a notification 44 from peripheral device 14 via messaging system 40 of a need to order a particular consumable, alert a user of PC 12 of notification 44, and provide an order location to the user for the consumable.

In one case, program 30 is further configured to collect a series of notifications 44 from one or more peripheral devices 14, and summarize the series of notifications 44. In one instance, the series of notifications 44 come from a single peripheral device 14. In another instance, the series of notifications 44 each come from separate, unique peripheral devices 14. Even further optionally, program 30 is configured to consolidate, or add together in a single list, a plurality of notifications from one or more peripheral devices 14.

Furthermore, program 30 can be further configured to request identification from a user of PC 12 to verify authorization of the user to submit an order for a consumable to reseller 24. In one case, program 30 can be configured to request at least one level of authorization from a user before sending an order for a consumable automatically via communication link 18 to reseller 24.

Even furthermore, program 30 can be further configured to provide an electronic shopping cart in order to enable electronic ordering of a consumable from PC 12 via communication link 18 from reseller 24. Hence, electronic ordering of the consumable can occur from one or more resellers 24 via Internet 23. In one case, program 30 is designed to prompt a customer, or user, of PC 12 for authorization information before submitting an order for at least one consumable via Internet 23 with reseller 24.

Communication link 18 can be provided in a number of different configurations. In one case, communication link 18 comprises an electronic communication link that enables program 30 to submit an e-mail order with reseller 24. In another case, communication link 18 comprises an electronic communication link that enables program 30 to submit a facsimile order with reseller 24. In yet another case, communication link 18 comprises an electronic communication link that enables program 30 to submit a web page purchase using a web site of reseller 24. In even another case, communication link 18 comprises an electronic communication link that enables program 30 to submit a telephone order with reseller 24.

In order to replenish consumables using system 10, program 30 cooperates with the system components of FIG. 1 to provide a notification system, a facilitation system, a consolidation system, an authorization system, and an order assistance system. Not all of such systems are needed when implementing system 10 in different environments, such as the environments provided in FIGS. 2–4.

A notification system comprises messaging system 40 within an embedded web server (EWS) of computer peripheral device 14 and messaging system 28 within PC 12. Such notification system identifies for a user a part number for a consumable that needs to be ordered for peripheral device 14. In one case, PC 12 further comprises web browser 26, and messaging system 28 comprises e-mail application 36. In such case, peripheral device 14 sends an e-mail notification 44 to PC 12 to alert a user to a need to order a consumable. Even furthermore, the e-mail notification 44 can identify the consumable by a part number.

In operation, the notification system alerts a user of PC 12 that they need to order a consumable for peripheral device 14 associated with PC 12. The facilitation system provides a communication link with reseller 24 of the consumable. In one embodiment, the notification system and the facilitation system combine with a consolidation system for consolidating a plurality of orders. In another embodiment, the notification system and the facilitation system combine with an authorization system for confirming that a user is authorized to place an order for the consumable. In yet another embodiment, the notification system and the facilitation system combine with an order assistance system that places an order for the consumable. In even other embodiments more than one of the consolidation system, the authorization system, and the order assistance system combine with the notification system and the facilitation system.

In order for system 10 of FIG. 1 to provide consumable order assistance, multiple unique functionality levels can easily be configured to provide an auto-reorder assistance and/or a reorder assistance when ordering consumables from a reseller. Accordingly, multiple levels of functionality can easily be configured at a level that is required by a customer within a specific environment. For example, an order assistance system can be configured to provide multiple levels of progressive order assistance utilizing the above-described notification system, facilitation system, consolidation system, authorization system, and order assistance system.

More particularly, the notification system can utilize an embedded web server and a messaging system to push consumable order information and alerts from peripheral device 14 to PC 12. Accordingly, such a system can alert a customer that the customer needs to order a consumable. Furthermore, the system tells customers what they need to order, including a part number for the consumable which needs to be ordered. Hence, the system identifies a need to order a consumable, and alerts the customer.

Pursuant to the facilitation system, the system tells a customer where to order a consumable. For example, a customer can order a consumable using a universal resource locator (URL), a telephone number, a facsimile number, or an e-mail address. Optionally, the system can give a customer an electronic communication system with which to order a consumable. Such a system can be wired or wireless. Examples of an electronic communications system include e-mail, facsimile, website connectivity, or other electronic means. The system enables a purchaser to choose from amongst a plurality of resellers. For example, a purchaser can choose a favorite reseller, and can save the name of such reseller within memory for recover at a later time, such as the next time the purchaser is ordering consumables. Furthermore, the system can include electronic shopping cart data list 38 which cooperates in filling out shopping cart 138. Accordingly, a facilitation system tells a purchaser where to order the consumables.

According to the consolidation system, the system collects a series of notifications, then summarizes the notifications for one or more computer peripheral devices. Furthermore, the system provides functionality that facilitates consolidation of notifications from the one or more devices. Accordingly, the consolidation system consolidates notifications in order to make it easier to determine what consumables need to be ordered.

According to the authorization system, the system can be set up to determine which purchasers or users are authorized to order consumables. The system gets authorization, or an approval, from a customer or user before the user sends an order to a reseller. According to one implementation, the system provides multiple levels of authorization. For example, a department manager can have a high level of authorization, whereas a local supervisor can have a lower level of authorization. Additionally, the system can get authorization information, such as credit card information and numbers, from a customer or a user.

Finally, the order assistance system comprises an auto-reorder system that automatically places an order for consumables without incurring any user intervention.

FIG. 2 illustrates a first environment 100 for which consumable order assistance system of FIG. 1 can be configured to have a first set of functionality levels for a home or single connection environment. As shown in FIG. 2, web information 46 is provided via the Internet 23. The computer peripheral device 14, comprising a printer 16, is interconnected with a local bus (not shown) with a PC 12. One or more users 48 of PC 12 interact with peripheral device 14 to obtain information on consumable levels, media levels and types, warnings and/or notifications, job assurance, and printer capabilities. A decision maker 50, in one case one of the users, also interacts with peripheral device 14 via PC 12. In one case, decision maker 50 comprises a credit card holder who is going to act as a purchaser in order to purchase consumables over Internet 23 from a reseller. Decision maker 50 interacts with peripheral device 14 to determine when to replace consumables, what consumables to replace, alternative parts that are needed, issue urgency, proactive warning of next issue(s), printer model, serial number, etc., pending maintenance notification, usage and/or depletion rate, the last reseller utilized, and other reseller sources. In response to interacting with peripheral device 14 and connecting with Internet 23, decision maker 50 submits an external order 52 utilizing the system of this invention. It is understood that web information 46 comprises part numbers for consumables, alternative part numbers for consumables, and selection information for a reseller.

As shown in FIG. 2, it is understood that one-to-one bi-directional communication occurs between users 48 of PC 12 and peripheral device 14. It is also understood that decision maker 50 of PC 12 pulls data in the form of web information 46 from Internet 23. It is understood that the decision maker is not necessarily a person who is immediately using printer 16. For example, user 48 might be a child, whereas decision maker 50 is a parent. It is also understood that a number of different forms of interaction can occur. Users 48 and decision maker 50 can use an existing application interface, can review a hard copy report, can view a web interface, or can inter using JAVA.

Figure 3:
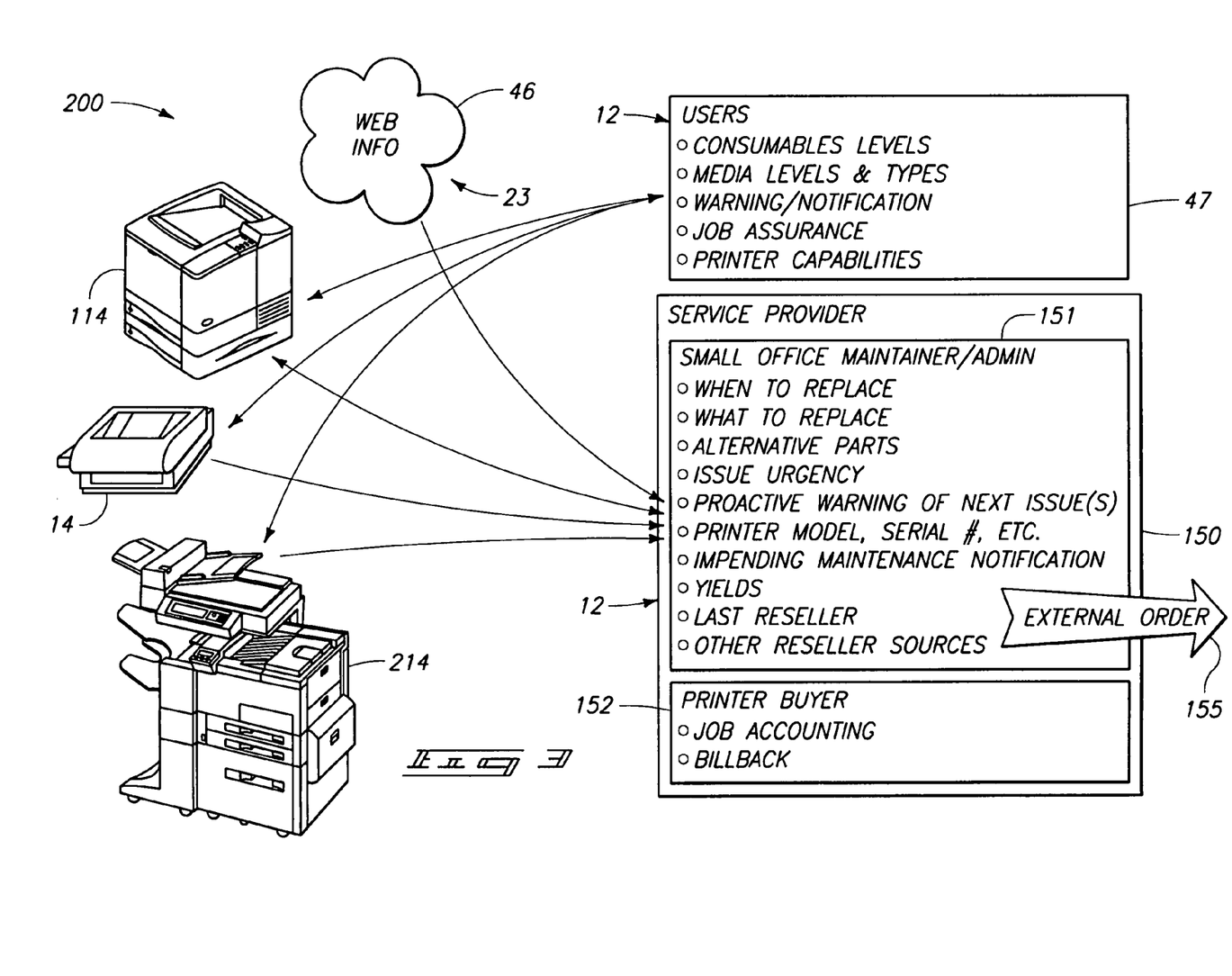
FIG. 3 is a simplified block diagram of the consumable order assistance system of FIG. 1 as applied to an unmanaged, small network environment.

FIG. 3 illustrates another environment 200 for which consumable order assistance system of FIG. 1 can be configured to have a first set of functionality levels for an unmanaged, small office environment. More particularly, users 48, each on a PC 12, interact in one-to-one bi-directional communication with a plurality of peripheral devices 14, 114, and 214. Additionally, the service provider 150, such as a small office maintainer and/or administrator 151 or a printer buyer 152, communicates via one or more PCs 12 bi-directionally to poll computer peripheral device 114 which comprises a Legacy printer. Service provider 150 receives web information 46 from the Internet 23. Furthermore, service provider 150 receives event push information from peripheral device 14 which comprises a laser printer having an embedded web server. Furthermore, service provider 150 receives additional event push information from computer peripheral device 214 comprising a multi-function peripheral device (MFP) having an embedded web server therein.

Web information 46 comprises consumable part numbers, alternative consumable part numbers, and selection information for choosing a reseller.

Users 48 bi-directionally interact with devices 14, 114, and 214 to obtain consumable levels, media levels and types, warnings and/or notifications, job assurance, and printer capabilities. Such interactivity occurs using a software application that provides such information, such as HP ToolBox, a commercially available product from Hewlett-Packard Company, of Palo Alto, Calif.

For the case of the small office maintainer and/or administrator 151, such individual receives information on when to replace a consumable, what consumables to replace, alternative parts needing maintenance, issue urgency, proactive warning of next issue(s), printer model, serial number, etc., impending maintenance notification, yields, last reseller utilized information, and other reseller source information. Such individual then submits an external order 155 to a reseller. In one instance, such submission is made via Internet 23. For the case of printer buyer 152, interaction provides job accounting information and bill back information.

Various forms of interaction occur within the environment depicted in FIG. 3. Such interaction for users 48, service provider 150, small office maintainer and administrator 151, and printer buyer 152 can occur using an existing application interface. Alternatively, it can occur using e-mail, a pager, a maintenance ticket, a hard copy report, an an electronic data interchange (EDI), a web interface, or a JAVA application.

Figure 4A:
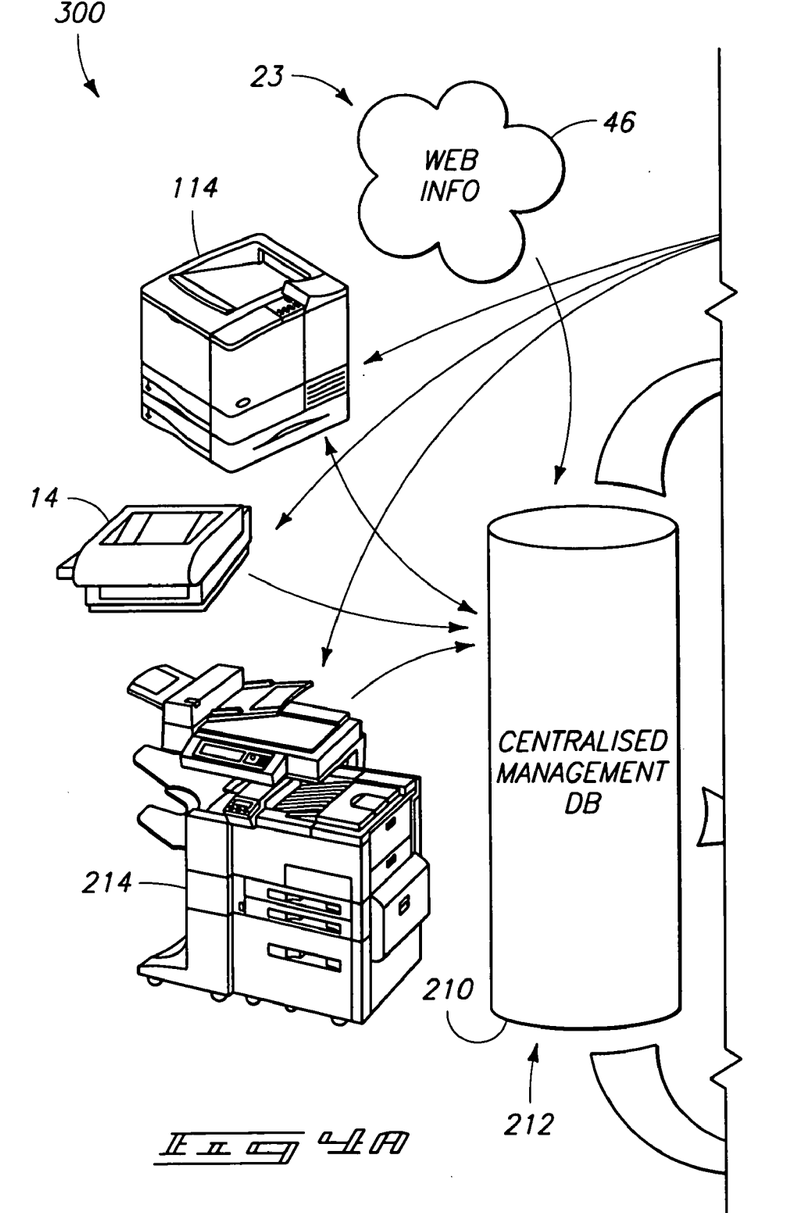
FIGS. 4A and 4B provide a simplified block diagram of the consumable order assistance system of FIG. 1 as applied to an enterprise environment.
Figure 4B:
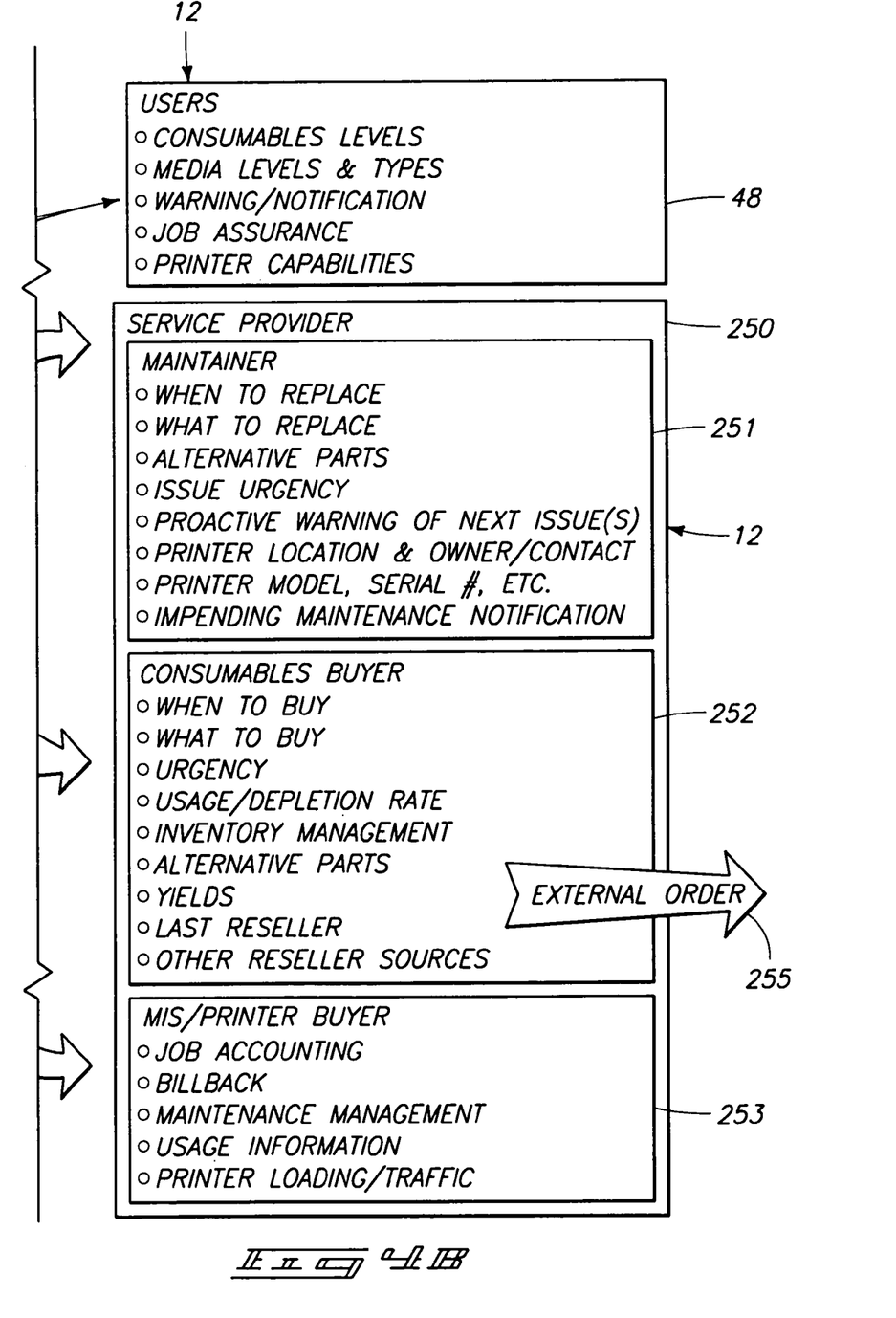

FIG. 4, provided by combining FIGS. 4A and 4B, illustrates a third environment 300 for which consumable order assistance system of FIG. 1 can be configured to have a first set of functionality levels for an enterprise environment. More particularly, an enterprise environment solution comprises a centralized management database provided on a server 212. Web information 46 is provided to database 210 by polling data from Internet 23. More particularly, web information 46 comprises consumable part numbers, alternative consumable part numbers, and information for selecting a reseller. Users 48 each use a PC 12 to communicate on a one-to-one relation bi-directionally with computer peripheral devices 14, 114, and 214. As was the case with the environment depicted in FIG. 3, computer peripheral device 14 comprises a printer having an embedded web server. Computer peripheral device 114 comprises a Legacy printer. Furthermore, computer peripheral device 214 comprises a multi-function peripheral (MFP) having an embedded web server.

Users 48 interact with devices 14, 114, and 214 to obtain information on consumable levels, media levels and types, warnings and/or notifications, job assurance, and printer capabilities. Such interaction occurs with a software application such as HP ToolBox, available from Hewlett-Packard Company, of Palo Alto, Calif.

Service provider 250 interacts via one or more PCs 12 with database 210. More particularly, service provider 250 comprises a maintainer 251 operating on a PC 12, a consumables buyer 252 also operating on a PC 12, and the management information system (MIS) manager and/or printer buyer 253 utilizing a PC 12.

Maintainer 251 interacts with database 210 to determine when to replace consumables, what consumables to replace, alternative parts for peripheral devices, issue urgency, proactive warning of next issue(s), printer location and owner/contact information, printer model, serial number, etc., and impending maintenance notification. Consumables buyer 252 interacts with database 210 to obtain information on when to buy consumables, what consumables to buy, urgency, usage and/or depletion rate, inventory management, alternative parts, yields, last reseller, and other reseller sources. Consumables buyer 252 submits an external order 355 to a reseller. One implementation entails the consumables buyer 252 submitting an external order to Internet 23.

Finally, MIS manager/printer buyer 253 interacts with database 210 to obtain information on job accounting, bill back, maintenance management, usage information, and printer loading/traffic information.

Interaction of service providers 250 can exist in a number of ways. For example, service provider 250 and users 248 can interact utilizing an existing application interface. Alternatively, they can interact using e-mail, pager, maintenance ticket, hard copy reports, electronic data interchange (EDI), a web interface, or a JAVA application.

Finally, centralized management database 210 in one form comprises an existing application such as OpenView 5, a network management software solution from Hewlett-Packard Company, of Palo Alto, Calif. OpenView supports SNMP and CMIP protocols. Furthermore, OpenView is an enterprise-wide network management solution. Alternatively, a Tivoli management software application for e-business applications, available from Tivoli Systems, Inc., of Austin, Tex., can also be utilized.

Accordingly, a method exists for providing order assistance pursuant to this invention. The method includes providing a computer peripheral device, a computer having a communication link with the reseller of a consumable, and a messaging system extending between the computer peripheral device and the personal computer. Next, the method includes detecting a need to replenish a consumable at the computer peripheral device. The method further includes notifying a user at the personal computer of the need to replenish the consumable. Furthermore, the method entails providing an order address location to a user for a reseller that sells the consumable. Finally, the method entails placing an order for the consumable with the reseller using the personal computer. In one instance, placing the order includes automatically placing the order for the consumable in response to notifying the user. In another case, prior to placing an order, the method entails querying a user to authorize placing the order with an identified reseller.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claim is:

1. A consumable order assistance system for computer peripheral devices, comprising:
    a personal computer having a web browser, a messaging system, and a consumable order assistance computer program;
    at least one computer peripheral device having an embedded web server and a messaging system provided by the embedded web server; and
    a communication link signal coupling the personal computer with a seller of a consumable for the computer peripheral device via the web browser;
    wherein the consumable order assistance computer program is configured to a) receive a notification from the computer peripheral device of a need to order a consumable via the messaging system of the personal computer and the messaging system of the at least one computer peripheral device, b) alert a user of the personal computer of the notification, and c) provide an order location to the user for the consumable; and
    wherein the consumable order assistance computer program is configured for multiple unique functionality levels to provide consumable order assistance when ordering the consumable, the multiple unique functionality levels being configured to be at a level that is customer defined, and wherein the embedded web server is configured to push information from the computer peripheral device to the personal computer.

2. The system of claim 1 wherein the consumable order assistance computer program is further configured to collect a series of notifications and summarize the series of notifications for one or more computer peripheral devices.

3. The system of claim 1 wherein the consumable order assistance computer program consolidates a plurality of notifications from the at least one computer peripheral device.

4. The system of claim 1 wherein the consumable order assistance computer program is further configured to request identification from a user to verify authorization of the user to submit an order.

5. The system of claim 1 wherein the consumable order assistance computer program is further configured to request at least one level of authorization from the user before sending an order via the communication link to a reseller of the consumable.

6. The system of claim 1 wherein the consumable order assistance computer program is further configured to request at least one level of authorization from the user before sending an order via the communication link to a reseller of the consumable.

7. The system of claim 1 wherein the consumable order assistance computer program is further configured to prompt the user for authorization information.

8. The system of claim 1 wherein the communication link comprises an electronic communication link that enables the consumable order assistance computer program to submit an e-mail order.

9. The system of claim 1 wherein the communication link comprises an electronic communication link that enables the consumable order assistance computer program to submit a facsimile order.

10. A computer-implemented system which implements a program in which consumable components of computer peripheral devices are replenished, the system comprising:
    a notification system that alerts a user of a personal computer that the user needs to order a consumable for a computer peripheral device associated with the personal computer, the computer peripheral device having an embedded web server, and the notification system being provided in the embedded web server for notifying the user at the personal computer;
    a facilitation system that provides a communication link with a reseller of the consumable via the personal computer; and
    at least one from a list of a) a consolidation system for consolidating a plurality of orders, b) an authorization system for confirming that a user is authorized to place an order for the consumable, and c) an order assistance system that places an order for the consumable;
    wherein the computer-implemented system is configured to establish multiple unique functionality levels at the personal computer to provide consumable order assistance when ordering the consumable from the personal computer, the multiple unique functionality levels being configured to be at a level that is customer defined.

11. The system of claim 10 wherein the notification system identifies for the user a part number for a consumable that needs to be ordered for the computer peripheral device.

12. The system of claim 10 wherein the notification system comprises a messaging system within an embedded web server of a computer peripheral device and a messaging system within a personal computer.

13. The system of claim 12 wherein the personal computer further comprises a browser, and the messaging system comprises an e-mail application, wherein the computer peripheral device sends an e-mail notification to the personal computer to alert the user of a need to order a consumable.

14. The system of claim 13 wherein the e-mail notification identifies the consumable by a part number.

15. The system of claim 10 wherein the system comprises the consolidation system configured to aggregate a plurality of notifications for one or more computer peripheral devices.

16. The system of claim 10 wherein the system comprises the authorization system configured to request authorization from a user prior to automatically submitting an order for the consumable to a reseller of the consumable.

17. The system of claim 10 wherein the system comprises the order assistance system configured to automatically submit an order for the consumable in response to receiving a notification that a consumable needs to be ordered.

18. A method of providing order assistance, comprising:
    providing a computer peripheral device, a personal computer having a communication link with a reseller of a consumable, and a messaging system extending between the computer peripheral device and the personal computer;
    detecting a need to replenish a consumable at the computer peripheral device;
    notifying a user at the personal computer of the need to replenish the consumable by communicating the need from the computer peripheral device to the personal computer through an embedded web server located on the peripheral device;

providing an order address location to the user at the personal computer for a reseller that sells the consumable; and placing an order for the consumable with the reseller using the personal computer to communicate with the reseller;

configuring a computer program operable on the computer peripheral device and the personal computer to operate in at least one of multiple unique functionality levels to provide consumable order assistance when ordering the consumable, the multiple unique functionality levels being configured to be at a level that is customer defined.

19. The method of claim 18 wherein placing the order comprises automatically placing the order for the consumable in response to notifying the user.

20. The method of claim 18 wherein, prior to placing an order, querying the user to authorize placing the order with an identified reseller.

21. A consumable order assistance system for computer peripheral devices, comprising:

a personal computer having a web browser and a messaging system;

at least one computer peripheral device having an embedded web server and a messaging system each configured to communicate on a one-to-one relation bi-directionally with the personal computer;

a bi-directional communication link signal coupling the personal computer with a seller of a consumable for the computer peripheral device via the web browser, the bi-directional communication link configured to enable a user to interact with the computer peripheral device to obtain information on a consumable for one computer peripheral device including at least one of a) consumable levels, b) media levels and types, c) warnings, d) notifications, e) job assurance, and f) printer capabilities;

a consumable order assistance computer program executable on the personal computer and configured to a) receive a notification from the computer peripheral device via the messaging system of a need to order a consumable, b) alert a user of the personal computer of the notification, and c) provide an order location to the user for the consumable; and a server communicating with one of the personal computer and the at least one computer peripheral device and including a centralized management database having information pulled from the Internet and comprising at least one of consumable part numbers, alternative consumable part numbers, and information for selecting a reseller;

wherein the consumable order assistance computer program system is configured for multiple unique functionality levels to provide consumable order assistance when ordering the consumable, the multiple unique functionality levels being configured to be at a level that is customer defined, and wherein the embedded web server is configured to push information from the computer peripheral device to the personal computer.

22. The consumable order assistance system of claim 21 wherein at least one of the server and the at least one computer peripheral device proactively generates the warning to the user at the personal computer comprising information on an upcoming issue regarding maintenance and operation of a selected computer peripheral device.

23. The consumable order assistance system of claim 21 wherein the personal computer includes an application interface comprising an electronic data interchange.

24. The consumable order assistance system of claim 21 wherein the centralized management database is configured for interaction with a maintainer at the personal computer to enable determination of when to replace a consumable as well as at least one of what consumable to replace, alternative parts for the associated peripheral device, issue urgency, proactive warning of one or more next issues, computer peripheral device location, owner/contact information, computer peripheral device model information, and impending maintenance notification.

* * * * *

UNITED STATES PATENT AND TRADEMARK OFFICE
CERTIFICATE OF CORRECTION

PATENT NO. : 6,937,999 B1
DATED : August 30, 2005
INVENTOR(S) : Haines et al.

It is certified that error appears in the above-identified patent and that said Letters Patent is hereby corrected as shown below:

Column 12,
Line 22, delete "the" and insert therefor -- a --.

Signed and Sealed this

Sixth Day of December, 2005

JON W. DUDAS
*Director of the United States Patent and Trademark Office*